US007636038B1

(12) United States Patent
Nof et al.

(10) Patent No.: US 7,636,038 B1
(45) Date of Patent: Dec. 22, 2009

(54) FAULT-TOLERANT TIMEOUT COMMUNICATION PROTOCOL WITH SENSOR INTEGRATION

(75) Inventors: Shimon Y. Nof, Lafayette, IN (US); Yan Liu, Fairborn, OH (US); Wootae Jeong, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 406 days.

(21) Appl. No.: 11/671,200

(22) Filed: Feb. 5, 2007

Related U.S. Application Data

(63) Continuation-in-part of application No. 11/484,345, filed on Jul. 10, 2006, now abandoned, which is a continuation of application No. 11/280,859, (Continued)

(60) Provisional application No. 60/450,000, filed on Feb. 25, 2003.

(51) Int. Cl.
G08B 29/00 (2006.01)
(52) U.S. Cl. .................. 340/506; 340/539.22; 340/517; 340/507
(58) Field of Classification Search ............... 340/506, 340/539.1, 539.16, 539.22, 539.24, 539.26, 340/517, 521, 501, 507; 707/104.1; 370/3.38, 370/401, 221, 310
See application file for complete search history.

(56) References Cited

U.S. PATENT DOCUMENTS 5,809,220 A * 9/1998 Morrison et al. ............. 714/12
(Continued)

OTHER PUBLICATIONS

Liu, Y., et al., "Distributed Micro Flow-Sensor Network Design and Modeling", *Proceedings of IFAC Workshop on Manufacturing, Modeling, Management and Control*, Prague, CR, Aug. 2-4, 2001, pp. 161-166.
(Continued)

*Primary Examiner*—Toan N Pham
(74) *Attorney, Agent, or Firm*—William F. Bahret

(57) ABSTRACT

A fault-tolerant timeout protocol for distributed sensor arrays and networks in which each sensor has a plurality of backup nodes, each of which is operable to send priority information which includes the product of the time needed for the backup node to transmit sensor information to a base station and the number of tasks offered to the backup node. In another embodiment, the base station stores the two values and calculates their product. In both cases, the lowest resulting value is used by the base station to select the backup node, which then sends backup sensor information. Another aspect of the present invention is a fault-tolerant sensor integration algorithm. The algorithm creates an abstract sensor defined as an interval having values above and below the reading of an associated physical sensor, and finds a range of values common to more than half of the abstract sensors. The algorithm obtains an output value based on the common range of values, and identifies the correct sensors, possibly faulty sensors, and faulty sensors by identifying the abstract sensors that include, respectively, (a) all of the common range, (b) part of the common range, and (c) none of the common range. A further aspect of the invention is a multi-hop information forwarding method for a wireless network. According to this method, a data source node transmits a signal to neighboring nodes among a plurality of distributed nodes, and each neighboring node which receives the signal from the source node transmits a reply signal which includes a weighted sum of factors including an energy factor and a distance factor for the neighboring node, the energy factor being indicative of the neighboring node's energy level and the distance factor being indicative of its distance from the source node. A forwarding node is selected on the basis of the weighted sums, and the source node transmits a data packet to the selected forwarding node, where the data packet is received and retransmitted either to a data sink node, e.g., a base station, or to another forwarding node.

19 Claims, 9 Drawing Sheets

Related U.S. Application Data filed on Nov. 16, 2005, now abandoned, which is a continuation-in-part of application No. 11/092,133, filed on Mar. 29, 2005, now abandoned, which is a continuation of application No. 10/786,607, filed on Feb. 25, 2004, now abandoned.

(56) References Cited

U.S. PATENT DOCUMENTS

| | | | |
|---|---|---|---|
| 6,304,556 B1 | 10/2001 | Haas | |
| 6,535,498 B1 | 3/2003 | Larsson et al. | |
| 6,775,258 B1 | 8/2004 | Van Valkenburg et al. | |
| 6,985,087 B2 | 1/2006 | Soliman | |
| 6,990,080 B2 | 1/2006 | Bahl et al. | |
| 6,996,368 B2 | 2/2006 | Orlik et al. | |
| 7,301,477 B2* | 11/2007 | Isoyama et al. | 340/870.13 |
| 2006/0126501 A1* | 6/2006 | Ramaswamy | 370/221 |

OTHER PUBLICATIONS

Liu, Y., et at, "Distributed Micro Flow-Sensor Network Design/Array and Modeling", *Proceedings of PRISM Symposium & Reunion*, West Lafayette, IN, Aug. 2001.

Anussornnitisarn, P., et al., "Time-out protocol for task allocation in multi-agent systems," *Journal of Intelligent Manufacturing*, vol. 13, 2002, pp. 511-522.

Peralta, J., et al., "Analysis of a time-out protocol and its applications in a single server environment," *Int. J. Computer Integrated Manufacturing*, vol. 16, No. 1, 2003, pp. 1-13.

Marzullo, Keith, "Tolerating Failures of Continuous-Valued Sensors," *ACM Transactions on Computer Systems*, vol. 8, No. 4, Nov. 1990, pp. 284-304.

Jayasimha, D.N., "Fault Tolerance in Multisensor Networks," *IEEE Transactions on Reliability*, vol. 45, No. 2, Jun. 1996, pp. 308-320.

Heinzelman, W.B., "Application-Specific Protocol Architectures for Wireless Networks," Ph.D. Thesis, Massachusetts Institute of Technology, 2000, 154 pages.

Heinzelman, W., et al., "An Application-Specific Protocol Architecture for Wireless Microsensor Networks," *IEEE Trans. On Wireless Communications*, vol. 1, No. 4, Oct. 2002, pp. 660-670.

Kang et al., "Smart Messages: A Distributed Computing Platform for Networks of Embedded Systems," *The Computer Journal, Special Focus-Mobile and Pervasive Computing*, vol. 47, Issue 4, 2004, The British Computer Society, pp. 475-494.

Boukerche et al., "Protocols for Data Propagation in Wireless Sensor Networks," in Mohsen Guizani (ed.), *Wireless Communications Systems and Networks*, Kluwer Academic/Plenum Publis, ©2004, pp. 23-51.

Zorzi et al., "Energy and Latency Performance of Geographic Random Forwarding for Ad Hoc and Sensor Networks," *IEEE Wireless Communications and Networking*, 2003, vol. 3, pp. 1930-1935.

Antoniou et al., "A New Energy Efficient and Fault-tolerant Protocol for Data Propagation in Smart Dust Networks Using Varying Transmission Range," *Proceedings of 37th Annual Simulation Symposium*, Arlington, Virginia, Apr. 2004, 10 pgs.

Prasad et al., "Functional Characterization of Fault Tolerant Integration in Distributed Sensor Networks," *IEEE Transactions on Systems, Man, and Cybernetics*, vol. 21, No. 5, Sep./Oct. 1991, pp. 1082-1087.

Niculescu, Drago§, "Communication Paradigms for Sensor Networks," *IEEE Communications Magazine*, vol. 43(3), Mar., 2005, pp. 116-122.

* cited by examiner

FAULT-TOLERANT TIMEOUT COMMUNICATION PROTOCOL WITH SENSOR INTEGRATION

CROSS-REFERENCE TO RELATED APPLICATIONS

The present application is a continuation-in-part of patent application Ser. No. 11/484,345, filed Jul. 10, 2006, abandoned, which is a continuation of patent application Ser. No. 11/280,859, filed Nov. 16, 2005, abandoned, which is a continuation-in-part of patent application Ser. No. 11/092,133, filed Mar. 29, 2005, abandoned, which is a continuation of patent application Ser. No. 10/786,607, filed Feb. 25, 2004, abandoned, which claims the benefit of provisional patent application No. 60/450,000, filed Feb. 25, 2003, which applications are hereby incorporated by reference along with all references cited therein.

BACKGROUND OF THE INVENTION

The present invention relates to sensor arrays and networks and, more particularly, to fault-tolerant communication methods for use with sensor arrays and networks.

Conventionally, single sensor systems have been used to save space and manufacturing cost. But they are not suitable for critical applications because a single sensor is inevitably affected by noise, refresh delay and other uncertainty issues and cannot guarantee to deliver accurate information all the time. Development of MEMS (Micro Electro Mechanical Systems) has enabled production of relatively large number of micro sensors at a low cost. Micro flow-sensors are one of the most common MEMS devices which have been developed in recent years. Distributed micro flow-sensor arrays and networks (DMFSA/N), built from collections of cooperating intelligent micro flow-sensor nodes, can improve the accuracy, timeliness, and reliability of systems. Sensors incorporated with dedicated signal processing functions are called intelligent sensors, or smart sensors. In this context, a micro flow-sensor array refers to a group of micro flow-sensors of the same type placed close together to measure the same variable of interest. Another possibility is to combine different types of sensors to measure different variables in the same array. Different groups of micro flow-sensor arrays can be distributed widely and selectively in the flow environment to form a micro flow-sensor network.

Due to the inherent constraints of sensors and other electronic components and the effects of flow environment, however, it is unrealistic to expect sensor nodes and the communication links to function properly all the time. Therefore, fault tolerance is an important part of the design of a DMFSA/N. However, a need remains for more effective and efficient fault-tolerant methods and systems.

SUMMARY OF THE INVENTION

The present invention provides various embodiments of communication protocols for use, for example, in communication of information in systems, sensor networks, sensor arrays and the like.

In one embodiment of a fault-tolerant method of communicating sensor information, the method includes providing a sensor architecture comprising a base station and a plurality of sensors associated with the base station, each sensor being operable to communicate sensor information to the base station and having associated therewith a plurality of backup nodes. Failed communication of sensor information from at least one sensor of the plurality of sensors to the base station is detected, e.g., a time-out occurs. Task information representative of the failed communication is sent to the backup sensors associated with the at least one sensor to request priority information therefrom. Each backup node which receives the task information generates priority information, and a backup node is selected based on the priority information received from the backup nodes. The selected backup node is prompted to send sensor information to the base station.

In a preferred implementation of this embodiment, the priority information for each backup node is based on the time needed for the backup node to transmit sensor information to the base station and the number of tasks offered to the backup node. More preferably, the priority information includes the product of the time needed and the number of tasks.

In another embodiment of a fault-tolerant method of communicating sensor information, the method includes detecting failed communication of sensor information to a base station from at least one sensor of a plurality of sensors, and evaluating the ability of each backup node associated with the at least one sensor to provide backup sensor information to the base station, the evaluation being based on the time needed for each backup node to transmit sensor information to the base station and the number of tasks offered to the backup node. Backup sensor information is requested to be sent to the base station from one of the backup nodes based on the evaluation.

In a preferred implementation of this embodiment, the base station stores the time needed for each backup node to transmit sensor information thereto, and the number of tasks offered to each backup node, and calculates the product of the time needed and the number of tasks.

Another aspect of the present invention involves fault-tolerant communication and sensor integration. In response to a sensed failure to receive information from a first sensor within an established timeout period, sensor information is requested from a backup sensor, and a fault-tolerant sensor integration algorithm is used for integration of the cumulative sensor information. The algorithm creates an abstract sensor for each sensor based on a reading therefrom, each abstract sensor defined as an interval having values above and below the associated reading, and finds a range of values common to more than half of the abstract sensors. The algorithm obtains an output value based on the common range of values, and identifies the correct sensors, possibly faulty sensors, and faulty sensors by identifying the abstract sensors that include, respectively, (a) all of the common range, (b) part of the common range, and (c) none of the common range.

Yet another aspect of the present invention is a multi-hop information forwarding method for a wireless network having a plurality of distributed nodes. According to this method, a data source node transmits a first signal to neighboring nodes among the plurality of distributed nodes, and each neighboring node which receives the first signal from the source node transmits a reply signal which includes a weighted sum of factors including an energy factor and a distance factor for the neighboring node. The energy factor is indicative of the neighboring node's energy level and the distance factor is indicative of its distance from the source node. A forwarding node is selected on the basis of the weighted sums, and the source node transmits a data packet to the selected forwarding node, where the data packet is received and retransmitted either to a data sink node, e.g., a base station, or to another forwarding node.

Objects and advantages of the present invention will be more apparent upon reading the following detailed description in conjunction with the accompanying drawings.

DESCRIPTION OF PREFERRED EMBODIMENTS

Figure 1:
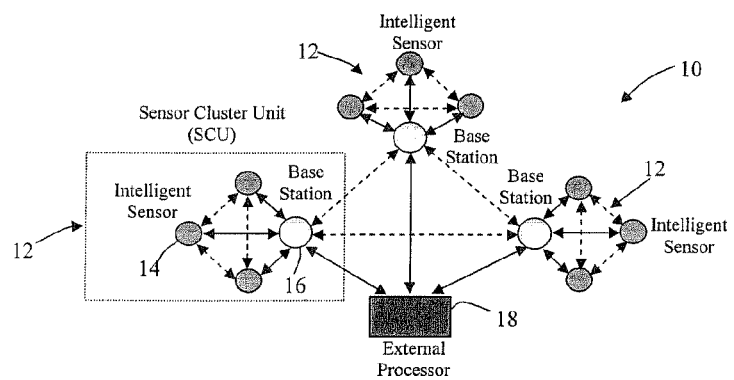
FIG. 1 is an illustration of cluster architecture for a distributed sensor system.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

One preferred embodiment of the present invention employs a cluster architecture for micro flow-sensor nodes, as shown in FIG. 1. This is a preferred architecture for efficient and fault-tolerant communication and integration in the system, as further described in the following article which is hereby incorporated by reference along with all references cited therein: Liu, Y., & N of., S. Y., "Distributed Micro Flow-Sensor Arrays and Networks: Design of Architectures and Communication Protocols." *International Journal of Production Research*, 42(15), 3101-3115, 2004.

In this embodiment, a sensor array or network 10 is divided into sensor cluster units (SCUs) 12, each of which consists of a set of intelligent micro flow-sensor nodes 14 and a base station 16. The intelligent sensor nodes within the same SCU are called sibling nodes. Each intelligent micro flow-sensor node consists of a micro flow-sensor that measures the variable of interest, and a dedicated processing unit. The base station, a more powerful processing unit, acts as the central controller of the respective SCU, governing signal transmission of the sensor nodes, managing information rerouting in case of link failures, and integrating the information from individual sensor nodes in the SCU. In order for the system to be tolerant to link failures, each sensor node sends information not only to the base station but also, as indicated by dashed lines, to one or more of its sibling nodes which serve as its backup nodes. An external processor 18 is linked to each SCU and integrates information from all the SCUs for decision making as required.

At the beginning of each data transmission cycle, the base station broadcasts the data transmission request to all the sensor nodes in the SCU. Receiving the request, each sensor node sends data to its associated buffer inside the base station. Then, the data will be retrieved by the processing unit in the base station. According to FTTP, the base station will stop waiting for the information from a sensor node after a certain amount of time, T, has passed, where T is a pre-determined time-out period whose value depends on the application. Immediately, the base station will send a message to one of its sibling nodes, the one that is expected to finish the rerouting task the earliest. As discussed below, two alternatives exist for where the base station should send the task announcement: (1) with a "blind" base station, the message is sent to all the sibling nodes; (2) with a smart base station, the message is only sent to the sibling node that can finish the task earliest, based on the current status of the nodes in the system.

A sensor network is represented below as having a set V of linked sensor nodes: $V=\{v_i\}(i=1, 2, \ldots, N_s)$, where $N_s$ is the number of sensor nodes in the network and $v_i$ is the sensor node i.

FTTP with Blind Base Station

Figure 2:
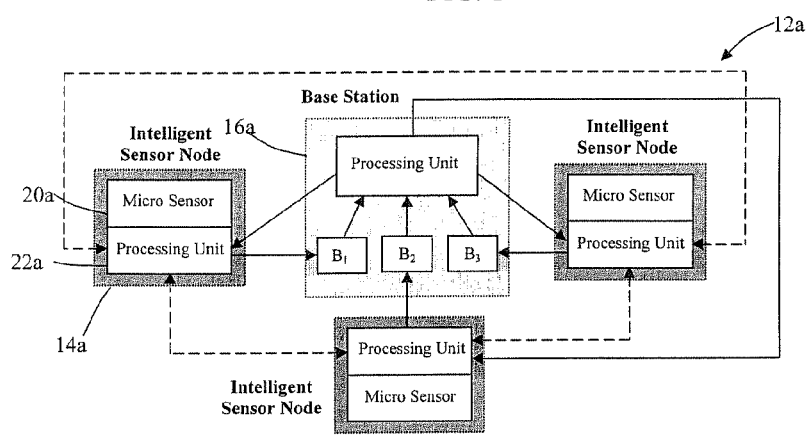
FIG. 2 is a block diagram of a sensor cluster unit (SCU) with a "blind" base station and intelligent sensor nodes.

FIG. 2 shows a sensor cluster unit 12a with a "blind" base station 16a and a plurality of intelligent micro flow-sensor nodes 14a, with one or more links (shown with dashed lines) for direct communications between sensor nodes. Each sensor node in this embodiment includes a micro flow-sensor 20a that measures the variable of interest, and a dedicated processing unit 22a. The base station includes buffers $B_1$, $B_2$ and $B_3$ as shown in FIG. 2 for incoming communications from the respective sensors, whereby, for example, the base station identifies the source of the incoming data.

Figure 3:
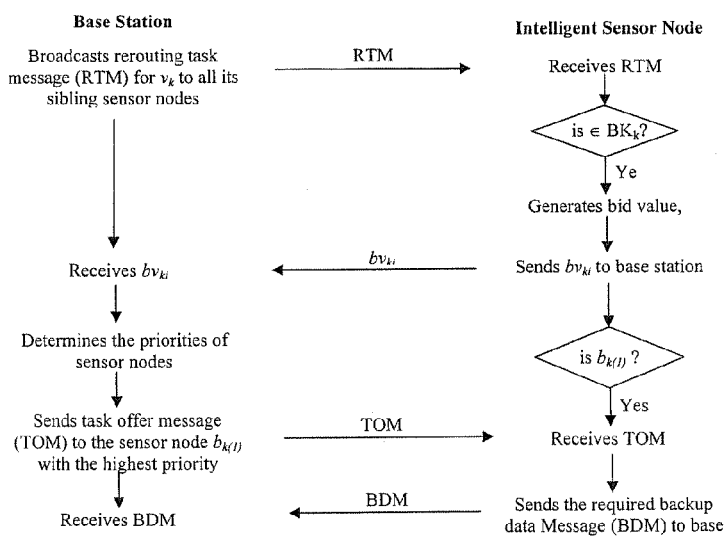
FIG. 3 is a logic chart of a fault-tolerant time-out protocol (FTTP) for the SCU with blind base station.

In the protocol for use with a blind base station, when the link of a sensor node, say node $v_k$, fails, the base station will broadcast the rerouting task message (RTM) for $v_k$ to all its sibling nodes. Receiving RTM, its backup node $b_{ki}$ (the ith backup node of $v_k$) generates a bid value $bv_{ki}$ and sends it to the base station. $b_{ki} \in BK_k$, where $BK_k$ is the set of backup nodes of $v_k$. $bv_{ki}$ can be calculated as follows:

$$bv_{ki}=(m_{ki}+1)\gamma_{ki}$$

where $\gamma_{ki}$ is the transmission rate of node $b_{ki}$ (time spent in transmitting one message) and $m_{ki}$ is the number of tasks that have been offered to node $b_{ki}$. The sensor node may be provided with sufficient capacity to keep track of its transmission rate over time, but in embodiments with a computation limit precluding such tracking, $\gamma_{ki}$ is assumed to be constant for node $b_{ki}$. The base station evaluates the priorities of the backup nodes based on their bid values (the lower the bid message (BDM) to the base station. The general logic chart of the FTTP with blind base station is shown in FIG. 3.

In one preferred embodiment, each sensor sends its sensor information to its backup nodes and a selected backup node forwards that sensor information to the base station. It is also envisioned that, in other embodiments, backup nodes may be normally inactive sensors and may send their own sensor information to the base station upon request in the event of a failure of a sibling node.

FTTP with Smart Base Station

Figure 4:
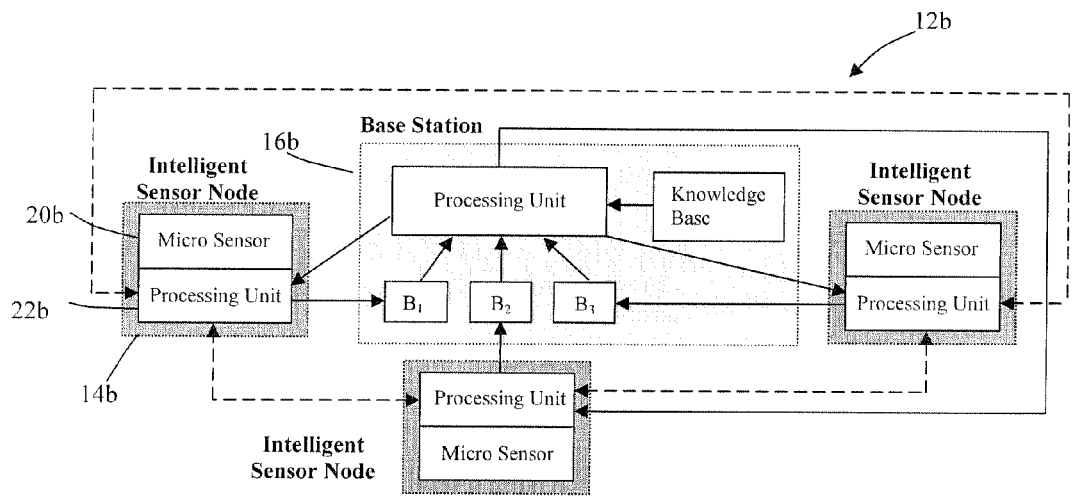
FIG. 4 is a block diagram of a sensor cluster unit (SCU) with a "smart" base station and intelligent sensor nodes.

FIG. 4 shows a sensor cluster unit 12b with a "smart" base station 16b and a plurality of intelligent micro flow-sensor nodes 14b, with one or more links (shown with dashed lines) for direct communications between sensor nodes. Each sensor node in this embodiment includes a micro flow-sensor 20b that measures the variable of interest, and a dedicated processing unit 22b. The base station includes buffers $B_1$, $B_2$ and $B_3$ as shown in FIG. 4 for incoming communications from the respective sensors.

Figure 5:
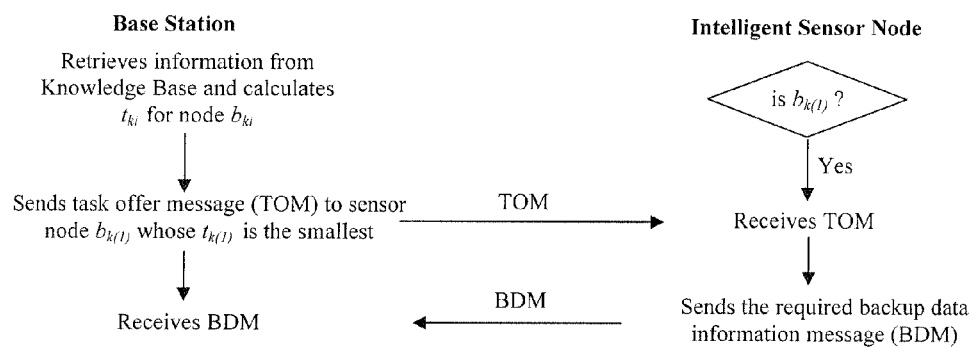
FIG. 5 is a logic chart of a fault-tolerant time-out protocol (FTTP) for the SCU with smart base station.

In this protocol, in order to limit unnecessary communication and reduce the communication traffic, instead of broadcasting RTM for $v_k$, whose link fails, to all its sibling nodes, the base station first evaluates the priorities of the its backup nodes and then sends TOM only to the node that is expected to finish the rerouting task the earliest. The time when the backup node $b_{ki}$ finishes the task, $t_{ki}$, can be calculated as, assuming the transmission starts at time 0:

$$t_{ki} = (m_{ki} + 1)\gamma_{ki}$$

where $m_{ki}$ is the number of tasks that have been offered to the backup node $b_{ki}$, and $\gamma_{ki}$ is the transmission rate of $b_{k(1)}$ (time spent in transmitting one message). The base station then sends TOM to the node $b_{k(1)}$ whose $t_{k(1)}$ is the smallest. In order to find $t_{ki}$, the base station needs to have a knowledge base which keeps track of the information for each node—its backup nodes, transmission rate, and the number of tasks that have been offered and, preferably, completed. The structure of the knowledge base is shown in the following table, in which n is the number of sensor nodes in the cluster and the backup nodes are hypothetical for illustration only. FIG. 5 shows the general logic chart of the FTTP with smart base station.

| Knowledge Base | | | |
|---|---|---|---|
| V | BK | $\gamma$ | m |
| $v_1$ | 2, 3, 4 | $\gamma_1$ | $m_1$ |
| $v_2$ | 1, 4, 5 | $\gamma_2$ | $m_2$ |
| ... | ... | ... | ... |
| $v_n$ | 3, n − 2, n − 1 | $\gamma_n$ | $m_n$ |

Compared with the FTTP with blind base station, the FTTP with smart base station requires less communication, and has the advantage of being able to keep track of the updated transmission rate of each sensor node, but it requires a base station with more complex structure (with an additional knowledge base). A smart base station is preferred, for example, in on-line control applications, in which response time can be critical.

Experiments with FTTP have shown that the FTTP with blind base station requires significantly less network evaluating time, $c_{et}$, than the FTTP with smart base station. The reason for this is that in the FTTP with blind base station, the bid values are calculated by the intelligent sensor nodes locally before they are sent to the base station, and the base station only evaluates the bid values and chooses the sensor node with the minimal bid value. More information transmission between the sensor nodes and the base station, however, is involved in the FTTP with blind base station. Because the information transmission time, $c_{tt}$, is much longer than $C_{et}$ that requires only computation, the total network communication time, $c_t$, which is the sum of $C_{et}$ and $c_{tt}$, of the FTTP with blind base station is significantly longer than that of the FTTP with smart base station. The difference of $c_t$ becomes more evident with increases in the number of sensor nodes in each cluster and with increases in the number of failed links.

Experiment results are contained in the above-referenced article entitled "Distributed Micro Flow-Sensor Arrays and Networks: Design of Architectures and Communication Protocols." Additional details regarding the FTTP and other aspects of the present invention may be found in the following thesis, which is incorporated herein by reference along with all references cited therein: Liu, Y., "Distributed Micro Flow-Sensor Arrays and Networks: Design of Architecture and Fault-Tolerant Integration," M. S. Thesis, Thesis 47510 MSIE, Purdue University, 2001 (publicly accessible July 2004).

The ability to place and activate the micro flow-sensors where and when they are needed enables better control of the flow process. And redundancy enables more reliable monitoring and control because occurrence of failures of some sensors will not inhibit the sensing ability of the system. A fault-tolerant time-out protocol as described above helps meet these objectives, especially when combined with integration of the distributed sensors' readings, as will now be described.

Fault-Tolerant Sensor Integration Algorithm

Another aspect of the present invention is a fault-tolerant sensor integration algorithm (FTSIA), an algorithm used to combine information from different sensors in the system and produce reliable results even if some sensors yield faulty information. It deals with the competitive integration of sensor information, in which each sensor ideally measures identical information, but, in reality, is subject to noise and other disruptions. This algorithm is executed in the processing unit of the base station in a SCU after information from all sensor nodes has been received. The algorithm operates with abstract sensors which are based on values from concrete sensors.

A concrete sensor (CS), as the term is used herein, is a device that measures the variable of interest in the environment. An intelligent micro flow-sensor node is an example of a CS.

An abstract sensor (AS), as the term is used herein, is defined as a dense interval—or range of values—that contains the value of the physical variable read by the CS. The reason for using AS is that it is more reasonable to consider the reading from a sensor as a continuous set of values instead of a point value, because of the variation of the data due to noise, manufacturing inaccuracies, and other uncertainty issues. AS is derived from the point value received from CS. If a CS, say $v_i$, reads a value, say $\tau_i$, and its maximum tolerable variation can be $\pm\epsilon_i$, then AS of $v_i$ can be defined as the interval $[L_i, U_i] = [\tau_i - \epsilon_i, \tau_i + \epsilon_i]$, where $L_i$ is the lower bound of $v_i$, and $U_i$ is the higher bound of $v_i$. An AS is correct if its interval contains the true value of the physical variable being measured. Otherwise, it is faulty. If AS $A_1$ and $A_2$ are correct, they must intersect and the intersection contains the true value of physical variable. An AS is said to be tamely faulty if it is not correct but its interval overlaps with that of a correct AS. A faulty AS that is not tamely faulty is said to be widely faulty.

A distinct m-interval, as the term is used herein, is an interval in which no more than m intervals intersect.

The inputs of this algorithm are readings from $N_s$ CSs, at most f of which are faulty (either tamely faulty, $f_t$, or widely faulty, $f_w$). Its outputs include a single output interval and the status of each sensor (correct, possibly tamely faulty, or surely faulty). A microsensor array/network may contain hundreds or thousands of small and inexpensive sensor nodes. It is the relatively large redundancy of the tiny electronic devices that ensures the ultimately high reliability and quality of the retrieved information. The assumption that at least half of the sensors in the array/network can give correct answers is reasonable in practical applications. In addition, individual sensors are assumed to be independent (i.e., not influencing each other's measurements) in this research. Furthermore, uniformity of values within each interval of AS is assumed in this algorithm because the probability that the true value falls at any point in the interval is equally likely. Under these assumptions, this algorithm guarantees that the single output interval contains the true value of measurement and the faulty sensors will be detected when the number of faulty sensors is less than that of the correct sensors, i.e., $$f < \frac{1}{2} N_s.$$

The rationale of the algorithm is as follows. Because ASs of all correct sensors must intersect and contain the true value and there are at least $N_s-f$ correct sensors, the true value must reside in one of the intervals whose levels are no less than $N_s-f$. Therefore, sensors whose corresponding ASs intersect with all m-interval ($m \geq N_s-f$) must be correct; those whose ASs do not intersect any m-interval ($m \geq N_s-f$) must be faulty, and the rest are possibly tamely faulty. Finally, the single output interval is the intersection of all surely correct sensors, and the range of the output interval is no greater than that of any correct sensor.

Figure 6:
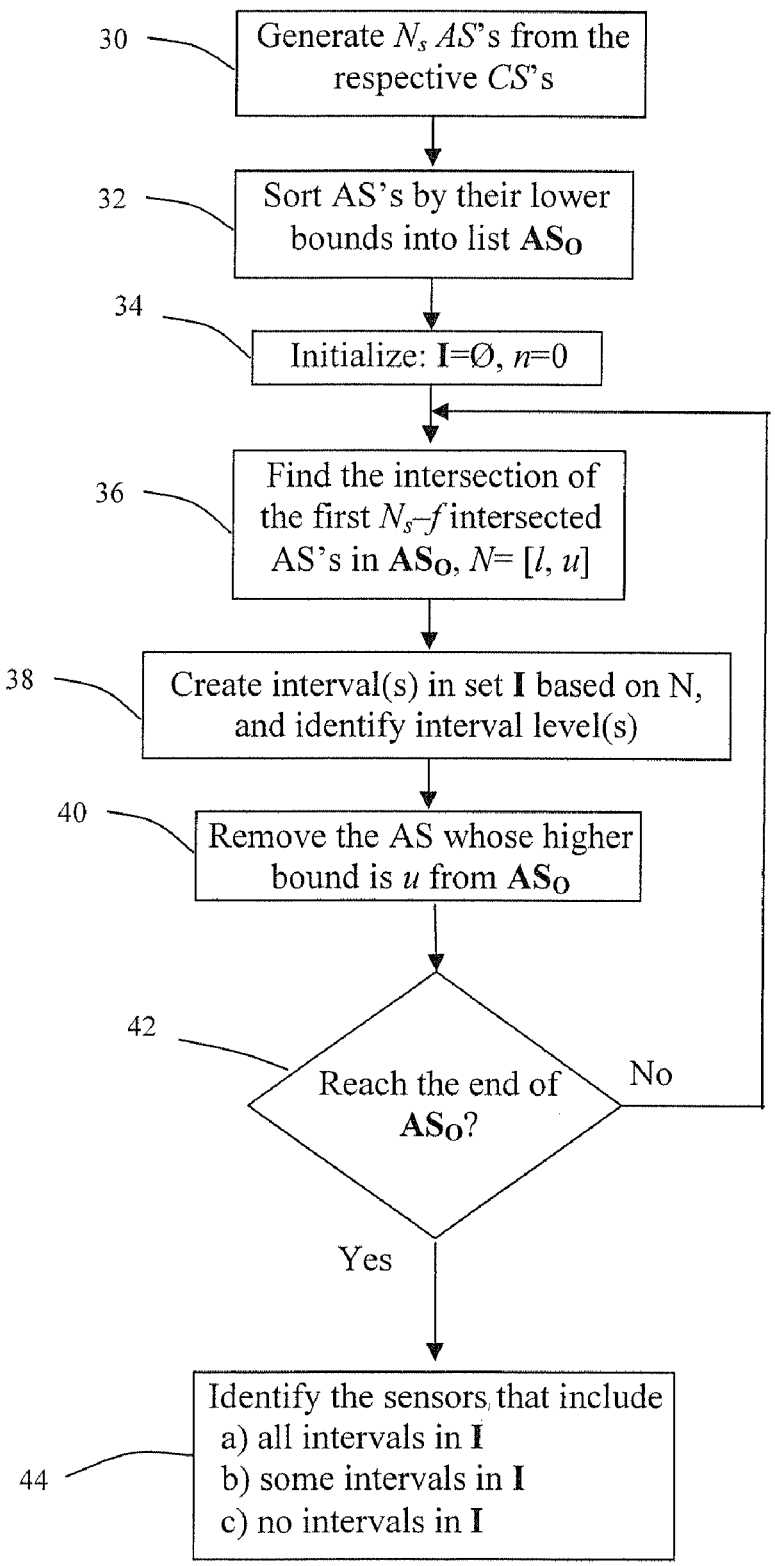
FIG. 6 is a flowchart of a preferred embodiment of a fault-tolerant sensor integration algorithm (FTSIA) according to another aspect of the present invention.
Figure 7A:
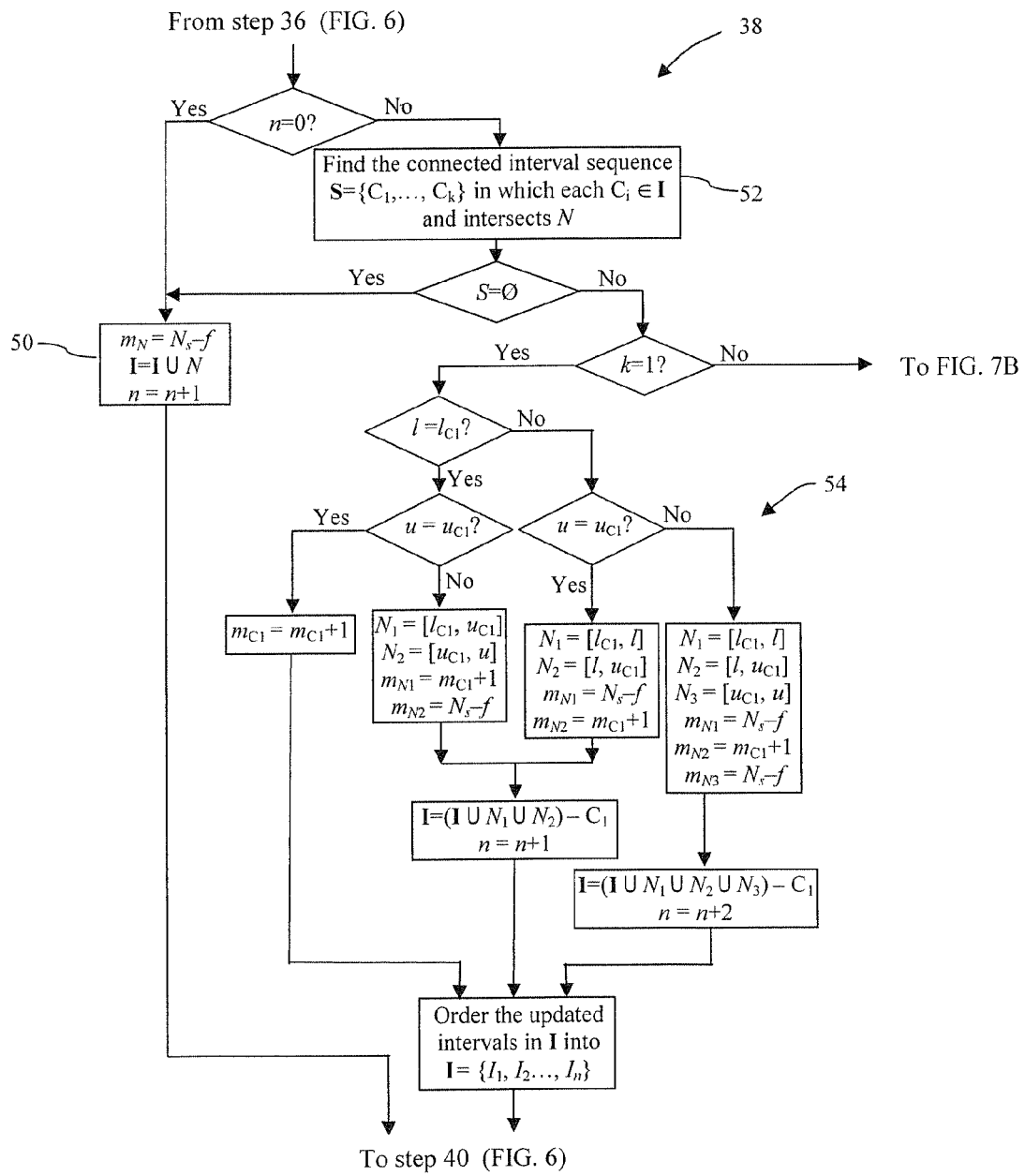
FIGS. 7A and 7B show details of a first portion of the flowchart of FIG. 6.
Figure 7B:
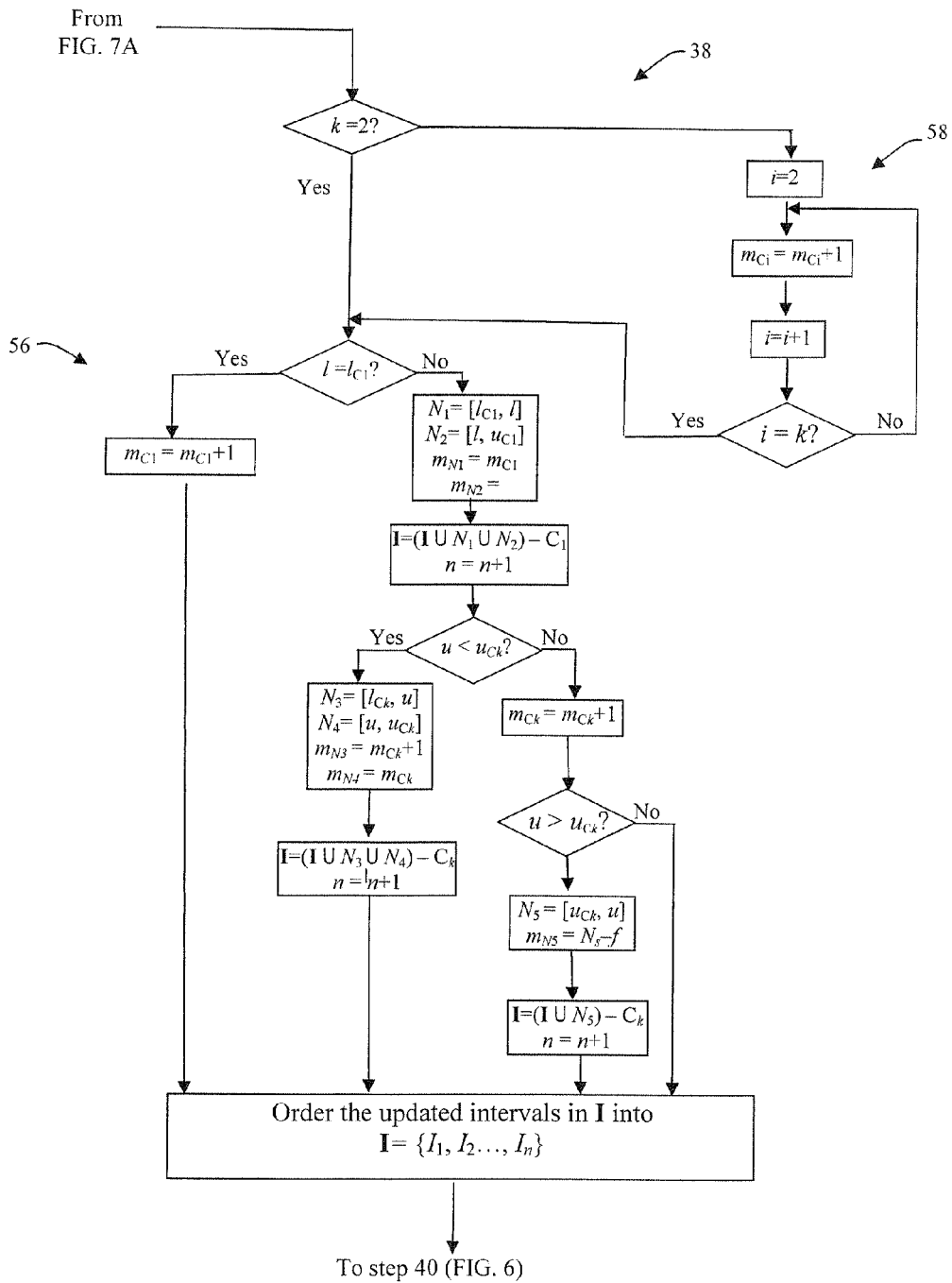
Figure 8:
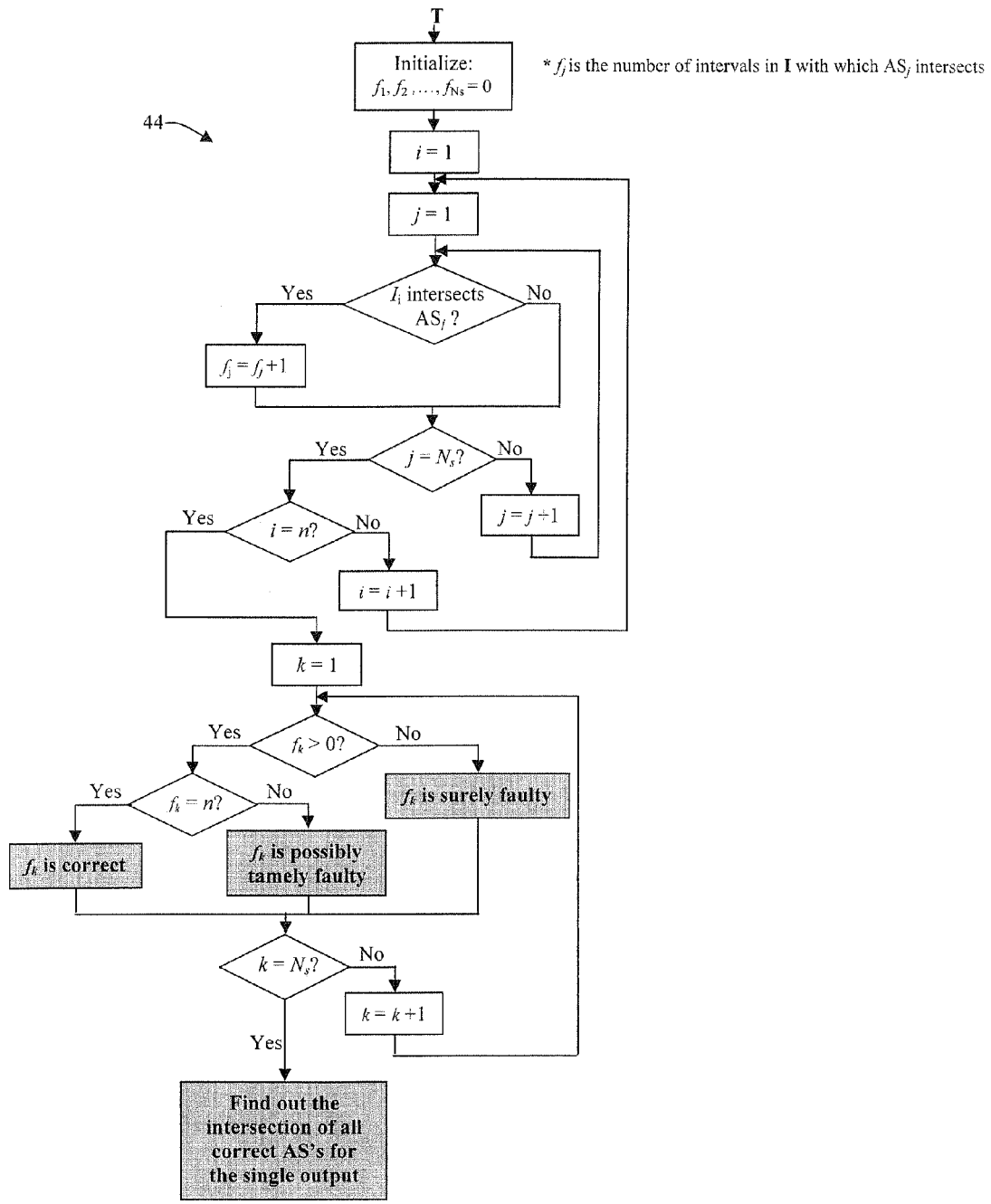
FIG. 8 shows details of a second portion of the flowchart of FIG. 6.
Figure 9:
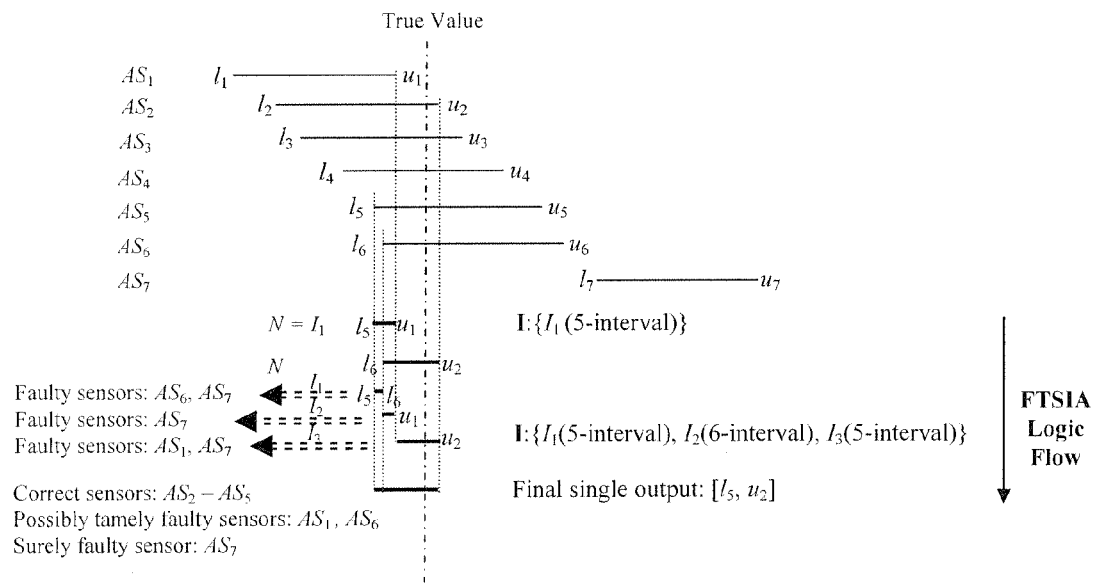
FIG. 9 is an illustration of the execution of the fault-tolerant sensor integration algorithm in an example with seven sensors.

The logic diagram of the algorithm is shown FIGS. 6-8. The execution of the algorithm is illustrated in FIG. 9 using an example with seven sensors among which two sensors are tamely faulty and one sensor is widely faulty. According to this algorithm, the readings of $N_s$ CSs are first converted to respective ASs, that is, $AS_i=[l_i, u_i]$ (i=1, 2, . . . , $N_s$), where $l_i$ and $u_i$ are the lower and higher bounds of $AS_i$, respectively (step 30). To simplify the process of finding the intersections of ASs, they are first sorted by their lower bounds into the ordered list $AS_O$, that is, $AS_O = \{AS_{(1)}, AS_{(2)} \ldots, AS_{(Ns)}\}$, where $l_{(1)} \leq l_{(2)} \leq \ldots \leq l_{(Ns)}$ (step 32). For example, in FIG. 9, each AS has a lower bound and higher bound, and they are ordered by their lower bounds, with $AS_1$ having the lowest lower bound. Let I be the list of all intervals derived from all ASs and n the number of intervals in I, and the lower bound, higher bound, and interval level of interval $I_i$ (i=1, 2, . . . , n) are $l_{li}$, $u_{li}$, $m_{li}$, respectively. Then, in step 34, I and n are initialized to the empty set Ø and 0, respectively.

In step 36, starting from the first $N_s-f$ intersected ASs in $AS_O$, the algorithm finds their intersection, N=[l, u]. For instance, if f=2 is assumed, the intersection of $AS_1$-$AS_5$ is N=[$l_5$ $u_1$]. Based on N, the algorithm creates one or more intervals in set I, and identifies each interval level, in a portion 38 of the flowchart shown in more detail in FIGS. 7A and 7B. The interval level is the number of sensors that include a given interval. In the example case, at this point in the logic flow, the first intersection [$l_5$ $u_1$] is inserted into I with level 5, i.e., $I_1$ (5-interval). Next, the AS whose higher bound is equal to u is removed from $AS_O$ (step 40) because it is no longer useful in finding intersections in later steps. If the end of $AS_O$ is not yet reached (decision block 42), the program returns to step 36 to find the intersection of the first $N_s-f$ intersected ASs in $AS_O$ again. For example, after the 5-interval [$l_5$, $u_1$] is inserted into I and $AS_1$ is removed from $AS_O$, the intersection of $AS_2$-$AS_6$ is N=[$l_6$, $u_2$]. Note that, if there were no intersection of the first five abstract sensors in step 36, the program would remove the first AS in $AS_O$ and then proceed directly to decision block 42. Once the end of $AS_O$ is reached, the algorithm proceeds to identify the sensors that include all, some or none of the intervals in I, in a part 44 of the flowchart shown in more detail in FIG. 8.

Details of the process of generating set I and identifying interval levels are shown in FIGS. 7A and 7B, representing part 38 of the flowchart of FIG. 6. If n=0 (no interval in I yet), then N is inserted into I directly, shown as I=I∪N in FIG. 7A (step 50). In the example case, the 5-interval [$l_5$, $u_1$] is directly inserted into I at this point as mentioned above. The number n is incremented by one and is thus greater than zero for the remainder of the logic flow, e.g., when the next intersection of ASs is found, namely, the intersection of $AS_2$-$AS_6$, N=[$l_6$, $u_2$]. When n>0 before N is inserted into I, each interval in I, $I_i$, needs to be checked to examine whether it intersects N. If so, $I_i$ and N may be divided into two or three intervals, depending on their lower and higher bounds. The level of the interval which is the intersection of $I_i$ and N increases by one, whereas the levels of other intervals remain the same if they already existed in I, or are assigned to $N_s-f$ otherwise. In other words, as each N is found, it if overlaps any prior interval in I, the level of that interval is incremented, and the remainder of N is level $N_s-f$ (level 5 in the example case). Therefore, when n>0, the program proceeds (step 52) to find the connected interval sequence S=$\{C_1, \ldots, C_k\}$ in which each $C_i \in$ I and intersects with N; k is the number of intervals that intersect with N. If S is an empty set, i.e., S=Ø (and k=0), then N is directed inserted into I and its level is $N_s-f$.

If there is only one interval in S, $C_1$, which intersects N, i.e., if k=1, then four scenarios 54 are possible, depending on the relationships between l and $l_{C1}$ and between u and $u_{C1}$, as shown in FIG. 7A. If k=2 (there are two intervals in S, $C_1$ and $C_2$, which intersect N), then four cases 56 are possible, depending on the relationships between l and $l_{C1}$ and between u and $u_{C2}$, as shown in FIG. 7B. If there are more than two intervals in S, $C_1, \ldots, C_k$, which intersect N, then the interval levels of $C_2, \ldots, C_{k-1}$ increase by one each as indicated at 58 in FIG. 7B, and again there are four possible situations 56 regarding the intersections formed by N and $C_1$ and by N and $C_k$, depending on the relationships between l and $l_{C1}$ and between u and $u_{Ck}$, as shown in FIG. 7B. Finally, the updated intervals in I are re-organized by their values, from the least to largest, into n ordered intervals, and the program proceeds to step 40 in FIG. 6, conditionally returning to find the next intersection of $N_s-f$ intersected ASs in $AS_O$. This procedure iterates till $AS_{(Ns)}$ in $AS_O$ is reached.

For example, in FIG. 9, the second 5-interval N is [$l_6$, $u_2$], and the 5-interval [$l_5$, $u_1$] is the only one in I that intersects N. Because $l_6$>$l_5$ and $u_2$>$u_1$, N and [$l_5$, $u_1$] form three intervals: 5-interval [$l_5$, $l_6$], 6-interval [$l_6$, $u_1$], and 5-interval [$u_1$, $u_2$]. Because $AS_3$-$AS_7$ cannot form a 5-interval, the process of finding intersections is stopped here.

After all the possible m-intervals ($m \geq N_s-f$) are derived, they are compared with each AS, as shown in FIG. 8. If an AS intersects all the intervals, then it must be correct. If an AS does not intersect any interval, then it must be faulty. If an AS intersects only some of the intervals, however, then it is possibly faulty. For instance, $AS_2$-$AS_5$ intersect all three intervals in I and thus must be correct sensors. Because $AS_7$ does not intersect any of the three intervals, it must be faulty. $AS_1$ does not intersect 5-interval [$u_1$, $u_2$] and $AS_6$ does not intersect 5-interval [$l_5$, $l_6$], so they are possibly faulty. If users know which of the possibly faulty sensors are (or are very likely to be) correct based on their prior knowledge, then the final interval may be made the intersection of the sensor ($AS_1$ or $AS_6$ in this example) and the surely correct sensors ($AS_2$-$AS_5$ in this example). Otherwise, the final interval is the intersection of four surely correct sensors, which is [$l_5$, $u_2$]. A single output value may be obtained by averaging the higher and lower bounds of the final output interval. Alternatively, a weighted combination of the mean values or other values of the subintervals of the final interval, based on the subinterval levels, may be obtained to produce a single output value.

An example of pseudo code for FTSIA is provided in the Appendix.

FTSIA Simulation

Three examples of cases simulated to test the FTSIA are described below. In each experiment, the single output from the FTSIA, which for these cases was the average of the higher and lower bounds of the output interval of the FTSIA, was compared with the mean of the same population of measurement values. The outputs of the FTSIA and mean calculations are also affected by the distribution of sensor readings. Therefore, in order to evaluate the reliability of both methods, the worst situation was simulated in all three cases as described below; it was assumed here that all the sensor nodes generated readings above the true value of the measured physical variable, i.e., $\Delta\tau_i = \tau_i - \tau^* > 0$ ($i=1, 2, \ldots, N_s$), where $\tau^*$ is the true value of the measured physical variable, $\tau_i$ is the reading received from the sensor node $v_i$, and $\Delta\tau_i$ is the error of the reading from $v_i$. In all three cases, it was assumed that $\tau^*=0.5$, the maximum tolerable variation of the sensor reading, $\epsilon$, was the same for all the sensor nodes, and $\epsilon = \pm 1\% \tau^* = \pm 0.005 . \pm 1\% \tau^*$ was chosen because it is considered as a desirable specification for flow sensors in industry. Because, according to its definition, a tamely faulty sensor is a sensor whose interval does not contain the true value but overlaps with that of a correct sensor, the errors of its reading had to be beyond ±1% but within ±2% of the true value in this experiment. Sensors whose errors of readings were beyond ±2% of the true value, therefore, were widely faulty. Furthermore, no prior knowledge regarding which possibly faulty sensors are very likely correct was assumed in this experiment; therefore, the final output interval from the FTSIA was the intersection of all surely correct sensors.

1) Case 1. In this case, all the sensors were assumed to be correct, generating readings with errors within ±1% of $\tau^*$ and their ASs contained $\tau^*$. Five experiment sets were conducted in this case: $N_s$ was equal to 8, 15, 21, 27 and 36.

2) Case 2. In this case, some sensors were assumed to be tamely faulty, i.e., they generated readings with errors beyond ±1% but within ±2% of $\tau^*$. Since tamely faulty ASs intersect with some correct ASs, they can form ($N_s$-f)-intervals that do not contain the true value. As mentioned earlier, readings of all possibly faulty ASs will be removed if there is no prior knowledge about them, among which some might be actually correct. As a consequence, in order for the algorithm to be effective in this case, $f_t$ must satisfy $$f_t < \frac{1}{2}N_s;$$

otherwise, there would be no correct ASs left after removing all possibly faulty ASs. Twelve experiment sets were conducted in this case: $N_s$ was equal to 8 with $f_t$ equal to 1, 2 or 3; $N_s$ was equal to 15 with $f_t$ equal to 1, 3, 5 or 7; and $N_s$ was equal to 21 with $f_t$ equal to 1, 3, 5, 7 or 10.

3) Case 3. In this case, some sensors were assumed to be widely faulty, i.e., they generated readings with errors beyond ±2% of $\tau^*$. In order to control the experiments, however, their readings were assumed to be within ±10% of $\tau^*$. Because when the readings from the widely faulty sensors are very close, it is possible that the widely faulty ASs intersect and form ($N_s$-f)-intervals that deviate the results from the correct one. In order to prevent this situation, the number of widely faulty sensors, $f_w$, needs to satisfy $$f_w < \frac{1}{2}N_s.$$

Twelve experiment sets were conducted in this case: $N_s$ was equal to 8 with $f_w$ equal to 1, 2 or 3; $N_s$ was equal to 15 with $f_w$ equal to 1, 3, 5 or 7; and $N_s$ was equal to 21 with $f_w$ equal to 1, 3, 5, 7 or 10.

Figure 10:
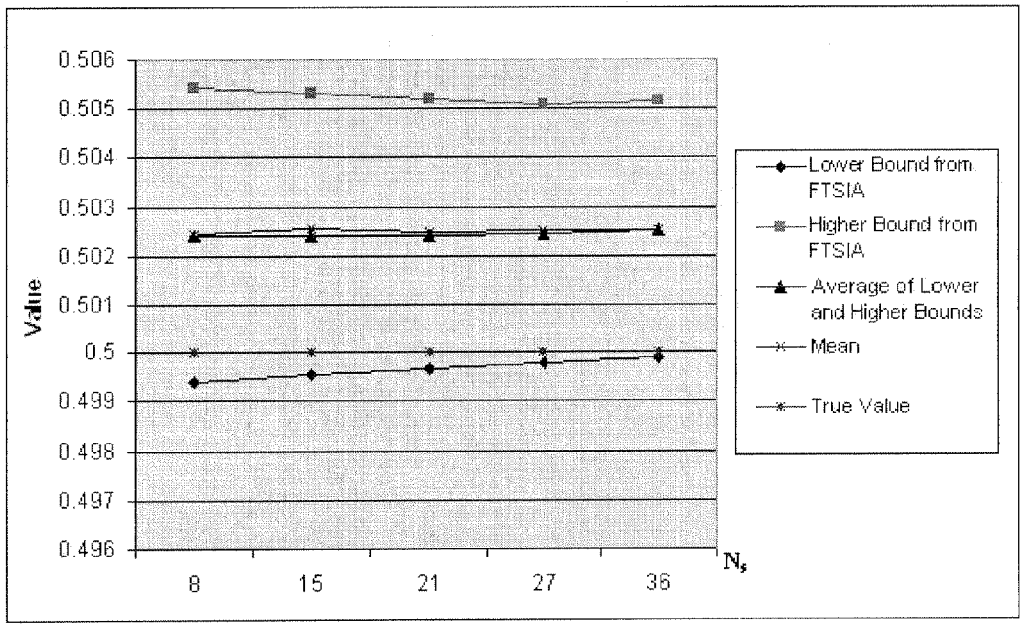
FIG. 10 is a graph of the outputs of the fault-tolerant sensor integration algorithm and the mean vs. number of sensor nodes ($\tau^*=0.5$).
Figure 11:
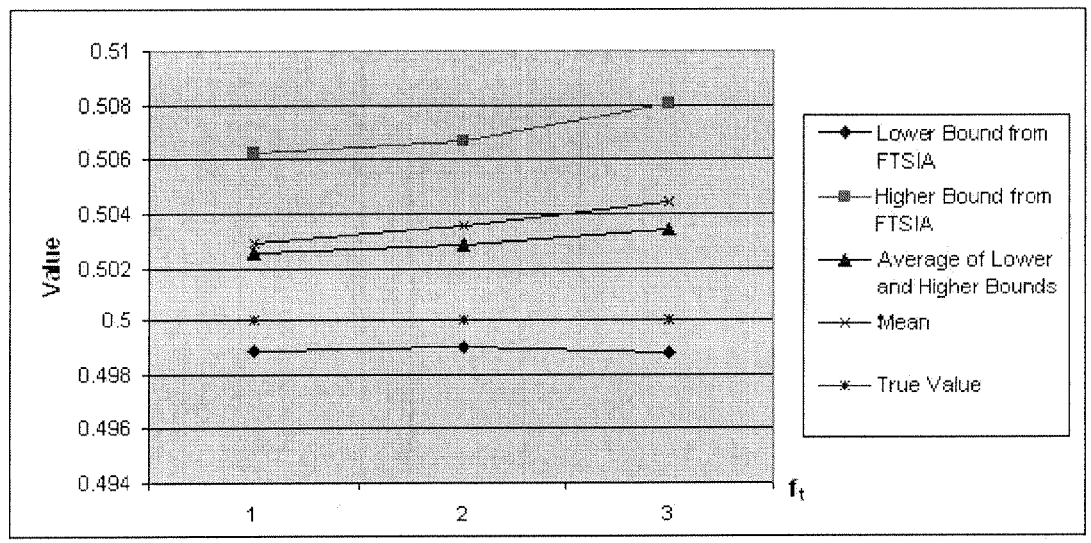
FIG. 11 is a graph of the outputs of the fault-tolerant sensor integration algorithm and the mean vs. number of tamely faulty sensor nodes ($\tau^*=0.5$, $N_s=8$).
Figure 12:
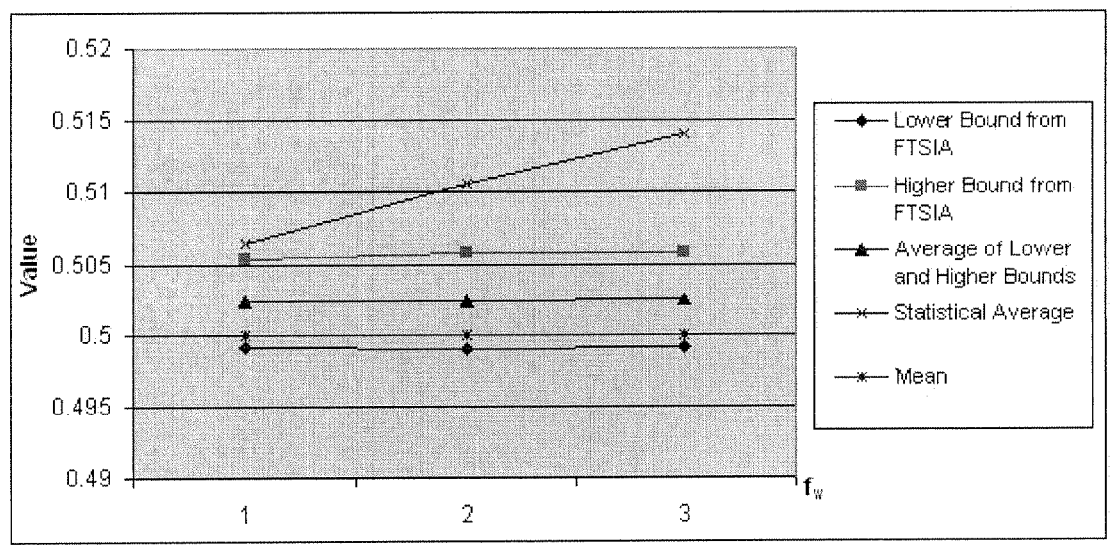
FIG. 12 is a graph of the outputs of the fault-tolerant sensor integration algorithm and the mean vs. number of widely faulty sensor nodes ($\tau^*=0.5$, $N_s=8$).

Each experiment set was repeated twelve times, with sensor readings simulated using a random number generator. FIG. 10 shows the result from FTSIA and the mean of all sensor readings vs. $N_s$ when f=0. The results from FTSIA and the mean of all sensor readings vs. $f_t$ when $N_s$ was equal to 8 are shown in FIG. 11. The results from FTSIA and the mean of all sensor readings vs. $f_w$ when $N_s$ was equal to 8 are shown in FIG. 12.

One-way analysis of variance (ANOVA) and Tukey's comparison test were used to analyze the results from the FTSIA experiments described above ($\alpha$=95%). The average of the lower and higher bounds from FTSIA and mean of sensor readings were compared. The analysis results are summarized below in Table 1, showing that when f=0 or $f_t$ was small relative to $N_s$, there was no significant difference between the FTSIA average and the mean of all sensor readings. However, when $f_t$ increased or $f_w$>0, the FTSIA average was significantly more accurate than the mean. The effects of $N_s$ and $f_t$ on the FTSIA outputs in case 2 are shown below in Table 2. The reason for such effects is that tamely faulty ASs can intersect with some correct ASs and form ($N_s$-f)-intervals that do not contain the true value, and the correct ASs that do not intersect with the incorrect ($N_s$-f)-intervals will also be removed as possibly faulty ASs. The correct ASs left usually have relatively higher errors because they not only intersect with the correct ASs, but also with some tamely faulty ASs. For example, in case 2 above, when $N_s$=15 and $f_t$=7 and when $N_s$=21 and $f_t$=10, only one correct AS was left after removing all the possibly faulty ASs, and this sensor had the highest sensor reading (the largest error) although still within the tolerable limits. Therefore, the performance of FTSIA degraded gracefully when $f_t$ increased, but the output interval generated still contained the true value. The results in Table 2 also indicate that in order to enable FTSIA to generate more accurate results, the number of correct sensors left after deletion, $n_c$, should be at least half of $N_s$, that is, $$n_c \geq \frac{1}{2}N_s.$$

Thus, $n_c$ can be calculated as $$n_c = N_s - 2 \ast f_t \quad (1)$$

Therefore, when all the faulty sensors are tamely faulty in the system, in order to generate more accurate results with FTSIA, under the assumptions discussed above, the design should satisfy $$N_s \geq 4 \ast f_t \quad (2)$$

For example, when $f_t=1$ and $N_s \geq 4$, when $f_t=3$ and $N_s \geq 12$, and when $f_t=5$ and $N_s \geq 20$, the FTSIA will yield more accurate results.

TABLE 1

| f | | | Conclusions 1 (FTSIA Output Vs. Mean of Senor Readings) | Conclusions 2 (FTSIA Output) |
|---|---|---|---|---|
| | F = 0 | | ** | $N_s = 8$ is ** from $N_s = 15$ and ** from $N_s = 21$** |
| $f_t > 0$ | $f_t = 1$ | $N_s = 8$ | * | $N_s = 8$ is ** from $N_s = 15$ |
| | | $N_s = 15$ | ** | and ** from $N_s = 21$** |
| | | $N_s = 21$ | ** | |
| | $f_t = 3$ | $N_s = 8$ | * | $N_s = 15$ is ** from $N_s = 21$; |
| | | $N_s = 15$ | * | $N_s = 8$ is * from $N_s = 15$ |
| | | $N_s = 21$ | ** | and $N_s = 21$ |
| | $f_t = 5$ | $N_s = 15$ | * | $N_s = 15$ is * from $N_s = 21$ |
| | | $N_s = 21$ | * | |
| | $f_t = 7$ | $N_s = 15$ | * | $N_s = 15$ is * $N_s = 21$ |
| | | $N_s = 21$ | * | |
| | $f_t = 10$ | $N_s = 21$ | * | |
| $f_w > 0$ | $f_w = 1$ | $N_s = 8$ | * | $N_s = 8$ is ** from $N_s = 15$ |
| | | $N_s = 15$ | * | and ** from $N_s = 21$** |
| | | $N_s = 21$ | * | |
| | $f_w = 3$ | $N_s = 8$ | * | $N_s = 8$ is ** from $N_s = 15$ |
| | | $N_s = 15$ | * | and ** from $N_s = 21$** |
| | | $N_s = 21$ | * | |
| | $f_w = 5$ | $N_s = 15$ | * | $N_s = 15$ is ** |
| | | $N_s = 21$ | * | from $N_s = 21$** |
| | $f_w = 7$ | $N_s = 15$ | * | $N_s = 15$ is ** |
| | | $N_s = 21$ | * | from $N_s = 21$** |
| | $f_w = 10$ | $N_s = 21$ | * | |

\* Significantly different
\*\* Not significantly different

TABLE 2

| $N_s$ | Conclusions |
|---|---|
| $N_s = 8$ | $f_t = 1$ is ** from $f_t = 2$; $f_t = 3$ is * from $f_t = 1, 2$ |
| $N_s = 15$ | $f_t = 1$ is ** $f_t = 3$; $f_t = 5$ is * from $f_t = 1, 3$; $f_t = 7$ is * from $f_t = 5$ and from $f_t = 1, 3$; |
| $N_s = 21$ | $f_t = 1$ is ** from $f_t = 3$ and ** from $f_t = 5$; $f_t = 7$ is * $f_t = 1, 3, 5$; $f_t = 10$ is * from $f_t = 7$ and * from $f_t = 1, 3, 5$ |

\* Significantly different
\*\* Not significantly different

The widely faulty ASs (shown in case 3), however, did not cause the same problem as tamely faulty ASs. They do not intersect with the correct ASs and thus are easier to be detected and removed without affecting the correct ASs (see Table 3 below). Therefore, $f_w$ does not have significant effects on the average of the results from FTSIA, as long as $f_w$ is less than half of $N_s$, that is, $$f_w < \frac{1}{2} N_s.$$

Therefore, when all the faulty sensors are widely faulty in the system, under the assumptions discussed above, the design should satisfy $$N_s > 2 \ast f_w \quad (3)$$

Because Equations (2) and (3) are linearly independent, it can be inferred that when both tamely faulty and widely faulty sensors exist in the system $N_s$ should satisfy $$N_s > 4 \ast f_t + 2 \ast f_w \quad (4)$$

in order for FTSIA to generate more accurate results. FTSIA also outputs which specific sensor nodes are possibly tamely faulty and which are surely faulty (tamely or widely). If a sensor node exists in all the possibly faulty sensor sets, it is surely faulty. On the other hand, if a certain sensor node appears in some (not all) faulty sensor sets, it is possibly tamely faulty.

TABLE 3

| $N_s$ | Conclusions |
|---|---|
| $N_s = 8$ | $f_w = 1$ is ** from $f_w = 2$ and ** from $f_w = 3$ |
| $N_s = 15$ | $f_w = 1$ is ** from $f_w = 3$ and ** from $f_w = 5$ and ** from $f_w = 7$ |
| $N_s = 21$ | $f_w = 1$ is ** from $f_w = 3$ and ** from $f_w = 5$ not ** from $f_w = 7$ and ** from $f_w = 10$ |

\* Significantly different
\*\* Not significantly different

Figure 13:
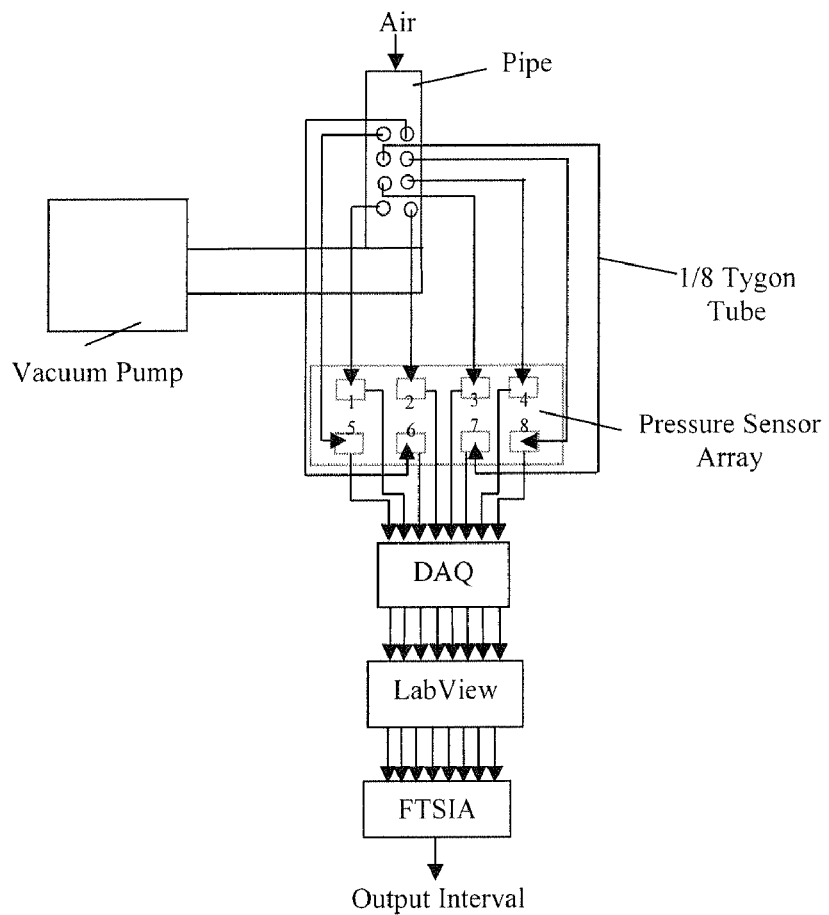
FIG. 13 is a block diagram of an embodiment of a pressure sensor array of 8 sensors with FTSIA.

The FTSIA algorithm described herein not only detects the possibly faulty sensors and surely faulty sensors but also generates a single output interval from the surely correct sensors after removing those faulty sensors. The true value of a measurement in practice is always obtained within an interval of accuracy. However, this final interval generated from the algorithm, which is the intersection of multiple correct sensors, guarantees that it includes the true value. Of course, the narrower the interval, the better and more useful the result. Therefore, it is contemplated that, based on background knowledge regarding which possibly faulty sensor is correct, a narrower final interval can be generated from the FTSIA. It is also contemplated that this algorithm can be applied to integrate readings from other types of sensors, other than the flow sensors, except that the maximum tolerable variances may change, depending on the Pressure Sensor Array FIG. 13 illustrates an embodiment of the present invention employing FTSIA with a pressure sensor array including eight pressure sensors. The sensors are connected via ⅛" Tygon tubes to respective holes in a pipe, and all eight sensors sense the pressure in the pipe as air is drawn through it with a vacuum pump. Because of low input signals from the sensors (less than 10 millivolts (mv)), differential inputs are used to reduce the noise effect. The sensor outputs are connected to a data acquisition board (DAQ), model KPCI-3107 manufactured by Keithley Instruments Inc. The data are retrieved with LabView software and input into the FTSIA to calculate the resulting output interval. In an experiment with the sensor array a suitable value of $N_s$ was selected in order to generate a more accurate result using the FTSIA. Initial experiments suggested that 2 out of 8 available pressure sensors in the array might be faulty; therefore, according to Equation (4), all 8 available pressure sensors had to be used to form a pressure sensor array in the experiment.

Table 4 shows the data, $\tau_i$, received from the pressure sensor array in one experiment run, and the lower bounds, $L_i$, and higher bounds, $U_i$, of the data intervals, assuming $\epsilon = \pm 0.25$ mv. After the $L_i$ and $U_i$ were input into FSTIA, the outputs generated were as shown below in Table 5. The output results showed that there was no 8-interval in which all ASs intersect, one 7-interval, and two 6-intervals. Because sensor 5 was considered as faulty in all three intervals, it was definitely faulty. Sensors 2 and 7 were possibly tamely faulty. After readings from these three sensors were removed, the final interval generated from the FTSIA was [7.00, 7.40], and the average of the lower and higher bounds of the interval was 7.20. However, if one of sensors 2 and 7 were known to very likely be correct, then a much narrower 6-interval could be the output. The mean of the readings from the sensor array was 7.27 (standard deviation 0.182).

In this experiment, because the true value of the measurement was not known, the output from the FTSIA and the mean of sensor readings are not compared statistically. However, this example demonstrates advantages of the FTSIA over statistical calculations. It does not merely provide a single output but also reports the status of each sensor (correct, possibly faulty, or faulty) and the possible intervals where the true value of the measurement resides.

TABLE 4

| $v_i$ | 0 | 1 | 2 | 3 | 4 | 5 | 6 | 7 |
|---|---|---|---|---|---|---|---|---|
| $\tau_i$ | 7.24 | 7.21 | 7.34 | 7.16 | 7.15 | 7.69 | 7.25 | 7.13 |
| $L_i$ | 6.99 | 6.96 | 7.09 | 6.91 | 6.90 | 7.44 | 7.00 | 6.88 |
| $U_i$ | 7.49 | 7.46 | 7.59 | 7.41 | 7.40 | 7.94 | 7.50 | 7.38 |

TABLE 5

| FTSIA | m-Interval | | | | | |
|---|---|---|---|---|---|---|
| | 6-Interval | | 7-Interval | | | |
| | Interval | Faulty Sensor(s) | Interval | Faulty Sensor(s) | Final-Interval | Average |
| | [7.00, 7.09] | 2, 5 | [7.09, 7.38] | 5 | [7.00, 7.40] | 7.20 |
| | [7.38, 7.40] | 5, 7 | | | | |
| Statistics | Mean | 7.27 | Std. Dev | 0.182 | | |

Timeout-Based Information Forwarding (TIF) Protocol

The present invention is also useful in a wireless sensor network (WSN). Wireless sensors usually operate with a limited power sources, such as batteries. In many applications, once deployed, the sensor nodes are either non-replaceable or non-rechargeable. Hence, battery power is a critically limited resource that has to be used efficiently to maximize the network lifetime. In a wireless sensor network, the majority of energy is consumed in radio communication rather than other activities, such as sensing and processing. Transmission and receiving energy may be characterized as follows.

Assuming that node A transmits a k-bit data packet with a distance d to the node B, node A dissipates energy as follows:

$$Et = \max(E_{min}, k \cdot (a + b \times r^\alpha)), 2 \leq \alpha \leq 4 \quad (5)$$

For the receiving node B, it should expend energy as follows:

$$Er = k \times c \quad (6)$$

Where the factors, a and c, are coefficients depending on the electronics energy and b is related to the transmit amplifying energy. The electronics energy is power consumption in the digital coding, modulation, and filtering of the signal before it is sent to the transmit amplifier. The amplifying energy factor, b, depends on the required receiver sensitivity and the receiver noise ratio. $E_{min}$ is a minimum radio transmission energy and the $\alpha$ is a degree of radio transmission which depends on the transmitting range for each node.

From Equations (5) and (6), therefore, the amount of energy required to transmit packets between two sensor nodes can be computed by $$E(k,r) = Et(k,r) + Er(k) = \text{Max}(E_{min}, k \cdot (a + b \times r^\alpha)) + k \times c \quad (7)$$

The total energy consumption in the entire WSN communication becomes a sum of energy dissipation among the nodes and can be calculated by $$E_{total} = \sum_{i \in \Gamma} E(k, r_i) = \sum_{i \in \Gamma} (Et(k, r) + Er(k)), \quad (8)$$

$$\forall i \in \Gamma = \sum_{i \in \Gamma} (\max(E_{min}, k \cdot (a + b \times r_i^\alpha)) + k \times c)$$

where the entire number of network links, $\Gamma$, can be increased in multiple short communication ranges, i.e., a multi-hop wireless sensor network.

The communication energy model adopted here may have a role not only in generating clusters in the sensor network, but also in deciding the routing path under the failure of communication link, because priority of routing node is a function of response time from nodes in this time-based control protocol.

Figure 14:
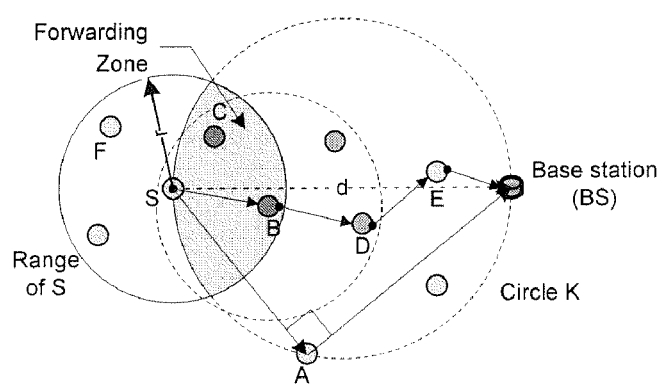
FIG. 14 is a diagram of a geometric information forwarding scheme for use with timeout-based information forwarding according to another embodiment of the present invention.

A geometrical information forwarding scheme will now be described with reference to FIG. 14. Assume that a data packet is forwarded from the source node, S, to the data sink node, or base station (BS). Due to the limited radio transmission range, r, in the node S, the data packet should be sent to the base station in a multi-hop fashion, i.e., via intermediate node B or C. Nodes within a virtual circle K with a diameter d, the distance between node S and the BS, become initial forwarding candidates because the nodes in the virtual circle K reduce transmission energy when a two degree power consumption model is used from Equation (5). For example, when the node S forwards data packets to the base station, node B, C, and E within the circle K can be considered as the first forwarding candidates because they satisfy the equation $$(\overline{N_sN_X})^2 + (\overline{N_XN_{BS}})^2 \leq (\overline{N_sN_{BS}})^2 \quad (9)$$

where $\overline{N_sN_X}$ is the distance between node S and a given node X. That is, since all nodes contain information about their locations, sending nodes can decide the first forwarding candidates from the circular region K defined by Equation (9). This equation is effectively a direction criterion for forwarding, and the transmission range of sending node S defines a range criterion. It will be understood that other direction and range criteria may be employed in appropriate applications, such as being within a parabolic, elliptical, or fan-shaped region oriented toward the base station.

Of course, if the transmission range of sending node S is equal to or greater than d ($r \geq d$), node S forwards data packets directly to the BS. However, since node S has a limited radio transmission range, r, node B or node C in the overlapping area identified in FIG. 14 as the forwarding zone becomes the prior forwarding candidate rather than the node E. If there exist no nodes in the overlapping area, node S may fail to forward a data packet or need to route data by forwarding data to other nodes in its transmission range r, e.g., node F. Otherwise, the sender should increase its transmission range, r, if possible, until it finds a proper forwarding candidate in the overlapping area.

In addition to the geometric data forwarding scheme, a timeout-based control scheme is used with a MAC scheme in network scheduling and control. According to one embodiment of a timeout-based protocol, sending nodes stop waiting for response from candidate nodes after a period of time, and select the next forwarding node with the shortest timeout values, which are included in a CTS (Clear-To-Send) message as described below.

The communication contention mechanism in the timeout control scheme is based on the IEEE 802.11 standard, i.e., using RTS (Request-To-Send) and CTS (Clear-To-Send) control packets to solve the hidden node problem and collision. IEEE 802.11 standard is hereby incorporated by reference. The MAC header format of the timeout control scheme, however, contains location of node itself and the base station. This additional location information in the MAC header is exchanged with RTS and CTS packets, and it is also used to calculate relative distances between nodes as shown in Equation (9). When the sender S forwards a data frame to all neighbors within its transmission range, it senses the medium until it is not busy. If it senses a clear medium, it waits an additional amount of time defined by a short interframe space (SIFS), and a DCF interframe space (DIFS) that is longer than SIFS. After DIFS, if the medium is still clear, the sender S sends RTS. The RTS frame includes a duration value specifying how much time it needs for sending. In this sensor network, location information of node itself and BS is also carried in the RTS frame. Therefore, receiving nodes compute and compare distances by using Equation (9). If they satisfy the directional condition, receiving nodes become prior forwarding candidates, provided that they are in the overlapping area in FIG. 14 identified as the forwarding zone. Otherwise, any other nodes within the transmission range of S can be forwarding candidate, e.g., node F. Once candidates receive the RTS frame, they set a timer to calculate the amount of time that elapses before sending a CTS packet to the sender. The CTS frame includes this amount of time. This amount of time is used as a timeout threshold which helps to select the most effective forwarding candidate considering entire networking efficiency. For example, the node which sends the CTS message with the shortest timeout value may be selected as the next forwarding node.

The main purpose of using the time threshold is to use sensors that have fast responses and more residual energy. That is, the more remaining energy a node has, the shorter its response time. If there exist many forwarding candidates within the transmission range, the protocol assigns high priority for the sensor that contains more remaining energy. Otherwise, it selects sensor located on the path which consume less transmission energy. This timeout also can help to tolerate faulty sensors, e.g., dead sensors with exhausted energy and malfunction, which cannot respond properly to the RTS packet during the TIF handshake scheme. The timeout threshold, Tr, is defined and calculated by $$Tr = 1 - \left(\frac{Er}{E} \cdot w_e + \frac{Dr}{D} \cdot w_d + Fr \cdot w_f\right) \quad (10)$$

E: Initial energy implemented at each node,

Er: Remaining energy at the forwarding node

D: The distance between current node and base station

Dr: The distance between sender and forwarding candidate

Fr: The probability of nonfailure of node communication (nonfailure of node and/or link)

We, Wd, Wf: Weighting factors for energy, distance, and nonfailure of node communication, respectively. (We+Wd+Wf=1)

The timeout threshold should not exceed the DCF Interframe Space (DIFS) of IEEE 802.11 because other sensors waiting to send data may interfere with the ongoing data transfer schedule. While the above-described forwarding protocol is particularly applicable to wireless networks having no AC power source, it also applies to AC-powered networks with battery backup, for example, and it is more generally applicable to wired and wireless communication networks where energy consumption and communication latency are of concern. The timeout threshold Tr may be sent as priority information for FTTP described above. The present invention also contemplates the use of FTSIA at multiple levels of a network. For example, in a network with multiple clusters each having a cluster head communicating with a higher-level base station, the FTSIA may be used at each cluster head and at the higher-level base station. It is also contemplated that a cell phone may be regarded as a wireless sensor for purposes of certain embodiments of the present invention.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

APPENDIX

1. Import readings from $N_s$ CSs and generate the respective ASs:
LB =< $LB_1, LB_2, \ldots, LB_i, \ldots, LB_{N_s}$ >, where $LB_i = \tau_i - \epsilon_i$;
HB =< $HB_1, HB_2, \ldots, HB_i, \ldots, HB_{N_s}$ >, where $HB_i = \tau_i + \epsilon_i$;
2. Sort the ASs by their lower bounds, and this sorted list is
L =< $L_1, L_2, \ldots, L_{N_s}$ > and the corresponding upper
bound set is U' =< $U_1', U_2', \ldots, U_{N_s}'$ >;
3. Sort the first ($N_s - f - 1$) intervals of U' and this sorted list is U;
4. Initialize the variables
I := Φ;   /* Initialize the interval set, in which each interval
has three attributes, lower bound l, higher bound u
    and level of interval m */
last := 0 ;   /* Initialize the number of intervals in I */
5. Main part of the algorithm
for j := f down to 0 do
5.1 Insert $U_{N_s-j}'$ in its
appropriate place in U to keep U sorted;
5.2 Find the intersection of ($N_s - f$) intervals
if ($L_{N_s-j} \leq U_{(1)}$), the   /* $U_{(1)}$ is
the first element in U   */
N := [$L_{N_s-j}, U_{(1)}$];
5.3 Insert N := [$L_{N_s-j}, U_{(1)}$], which is a
($N_s - f$)-interval, into I and make appropriate
changes to I
5.3.1 Locate the connected interval sequence
S = [$C_1, C_2, \ldots, C_k$] in I in which each $C_i$
intersects with N;
5.3.2 Condition 1: If S is empty insert N to the tail I
if (S = Φ)
    I := I ∪ N;
    last := 1;
else
5.3.3 Condition 2: If there is only one interval $C_1$
is S, find the intersection of N and $C_1$ -continued

```
if (S = [C₁])
    if (l_{c₁} = L_{N_s−j})
        if (U_{(1)} = u_{c₁}) then
            m_{c_k} := m_{c_k} + 1;
        else    /* if (U_{(1)} > u_{c₁})*/
            N₁ := [l_{c₁}, u_{c₁}];
            N₂ := [u_{c₁}, U_{(1)}];
            m_{N₁} := m_{c₁} + 1;
            m_{N₂} := N_s − f;
            I := (I ∪ N₁ ∪ N₂) − C₁;
            last := last + 1;
        end if
    else    /* if (l_{c₁} < L_{N_s−j}) */
        if (U_{(1)} = u_{c₁}) then
            N₁ := [l_{c₁}, L_{N_s−j}];
            N₂ := [L_{N_s−j}, U_{(1)}];
            m_{N₁} := N_s − f;
            m_{N₂} := m_{c₁} + 1;
            I := (I ∪ N₁ ∪ N₂) − C₁;
            last := last + 1;
        else    /* if U_{(1)} > u_{c₁} */
            N₁ := [l_{c₁}, L_{N_s−j}];
            N₂ := [L_{N_s−j}, u_{c₁}];
            N₃ := [u_{c₁}, U_{(1)}];
            m_{N₁} := N_s − f;
            m_{N₂} := m_{c₁} + 1;
            m_{N₃} := N_s − f;
            I := (I ∪ N₁ ∪ N₂ ∪ N₃) − C₁;
            last := last + 2;
        end if
    end if
else
5.3.4. Condition 3: intervals C₂, . . . , C_{p−1} completely overlaps N
    for k := 2 to p − 1 do
        m_{c_k} := m_{c_k} + 1;
    end for
    if (l_{c₁} = L_{N_s−j}) then
        m_{c₁} := m_{c₁} + 1;
    else /* if l_{c₁} < L_{N_s−j}, Split [l_{c₁}, u_{c₁}] into two intervals */
        N₁ := [l_{c₁}, L_{N_s−j}];
        N₂ := [L_{N_s−j}, u_{c₁}];
        m_{N₁} := m_{c₁};
        m_{N₂} := m_{c₁} + 1;
        I := (I ∪ N₁ ∪ N₂) − C₁;
        last := last + 1;
    end if
    if (U_{(1)} = u_{c_p}) then
        N₃ := [l_{c_p}, U_{(1)}];
        N₄ := [U_{(1)}, u_{c_p}];
        m_{N₃} := m_{c_p} + 1;
        m_{N₄} := m_{c_p};
        I := (I ∪ N₃ ∪ N₄) − C_p;
        last := last + 1;
    else /* if U_{(1)} ≥ u_{c_p} */
        m_{c_p} := m_{c_p} + 1;
        if (U_{(1)} > u_{c_p}) then
            N₅ := [u_{c_p}, U_{(1)}];
            m_{N₅} := N_s − f;
            I := (I ∪ N₅) − C_p;
        end if
    end if
end if
5.3.5 Remove the AS [L_{(1)}, U_{(1)}] from the list of ASs
L := L − L_{(1)}; U := U − U_{(1)};
end for
6. Find out all the possibly tamely faulty and surely faulty sensors
for i := 0 up to last − 1 do
    for j := 0 up to N_s do
        if ((HB_j >= u_{c_i}) or (LB_j <= l_{c_i})) /*
            sensor j is faulty if interval i contains the true value */
            F_i = F_i ∪ j; /*insert sensor j into
            the set of faulty sensors of interval i; F_i is
            the set of faulty sensors of
                        interval i */
        end if
    end for
end for
for i:=0 up to N_s
    for j:=0 to last−1 do
        if (i ∈ F_j) then
            n_{fi} := n_{fi} + 1;
        end if
    end for
    if (n_f = 0)
        sensor i surely correct;
    else
        if (n_f = last)
            sensor i is surely faulty;
        else
            sensor i is possibly tamely faulty;
        end if
        CLB := LB − {LB_i}; /*CLB is set of the
            lower bound of the surely correct sensors */
        CHB := HB − {HB_i}; /*CHB is set of the
            higher bound of the surely correct sensors */
    end if
end for
7. Find out the output data
sort CLB and the sorted list is CL =< CL₁, CL₂, . . . CL_m >;
sort CHB and the sorted list is CH =< CH₁, CH₂, . . . CH_m >;
I_o = [CL_m, CH₁];    /* I_o is the output interval */
```

We claim:

1. A fault-tolerant method of communicating sensor information, comprising:

providing a sensor architecture comprising a base station and a plurality of sensors associated with said base station, each sensor operable to communicate sensor information to said base station and having associated therewith a plurality of backup nodes;

detecting failed communication of sensor information from at least one sensor of said plurality of sensors to said base station;

sending task information representative of said failed communication to said backup nodes associated with said at least one sensor to request priority information therefrom;

generating priority information in each backup node which receives said task information;

selecting the backup node based on priority information received from backup nodes; and prompting said selected backup node to send sensor information to said base station.

2. The method of claim 1, wherein said priority information for each backup node is based on a time needed for the backup node to transmit sensor information to said base station and the number of tasks offered to the backup node.

3. The method of claim 2, wherein said priority information for each backup node includes a product of a time needed for said backup node to transmit sensor information to said base station and the number of tasks offered to said backup node.

4. The method of claim 2, wherein each sensor sends its sensor information to said base station and to its backup nodes; and wherein said selected backup node forwards the sensor information from said at least one sensor to said base station in response to said request.

5. A fault-tolerant method of communicating sensor information, comprising:

providing a sensor architecture comprising a base station and a plurality of sensors associated with said base station, each sensor operable to communicate sensor information to said base station and backup sensor information to a plurality of associated backup nodes;

detecting failed communication of sensor information from at least one sensor of said plurality of sensors to said base station;

evaluating the ability of each backup node associated with said at least one sensor to provide backup sensor information to said base station upon detected failure of said at least one sensor, said evaluation being based on the time needed for said backup node to transmit sensor information to said base station and a number of tasks offered to said backup node; and requesting that backup sensor information be sent to said base station from one of said backup nodes based on said evaluation.

6. The method of claim 5, wherein said evaluation includes calculating a product of a time needed for said backup node to transmit sensor information to said base station and the number of tasks offered to said backup node.

7. The method of claim 6, wherein said base station stores (a) the time needed for each backup node to transmit sensor information thereto and (b) the number of tasks offered to each backup node.

8. A fault-tolerant method of communicating and integrating sensor information, comprising:

providing a sensor architecture comprising a base station and a plurality of sensors associated with said base station, each sensor operable to communicate sensor information to said base station and having associated therewith at least one backup sensor;

sensing a failure to receive sensor information from a first sensor among said plurality of sensors within an established timeout period;

requesting sensor information from the backup sensor for said first sensor in response to said sensed failure; and integrating sensor information from said sensors, said sensor integration including creating an abstract sensor for each sensor based on a reading therefrom, each abstract sensor defined as an interval having values above and below the associated reading;

finding a range of values common to more than half of said abstract sensors;

obtaining an output value based on said common range of values; and identifying correct sensors, possibly faulty sensors, and faulty sensors by identifying the abstract sensors that include, respectively, (a) all of said common range, (b) part of said common range, and (c) none of said common range.

9. The method of claim 8, wherein said output value is the average of the overall highest and lowest values in said common range of values.

10. The method of claim 8, wherein said output value is a weighted combination of values from subintervals of said common range of values.

11. The method of claim 8, wherein said abstract sensor intervals have a uniform tolerable variation from the respective associated readings.

12. The method of claim 11, wherein said sensor integration further includes identifying a plurality of subintervals within said common range, and identifying the number of sensors that include each subinterval.

13. The method of claim 12, wherein said sensor integration comprises:

sorting said abstract sensors into an ordered list;

finding the intersection N of the first X sensors in said ordered list, where X is greater than half the number of sensors;

creating at least one interval I from the current intersection N, with each interval I having an identified level corresponding to the number of sensors that include the interval, said creating step including dividing any preexisting interval I that is partially overlapped by the current N and incrementing the level of the overlapped portion of said preexisting interval I;

removing from said ordered list a sensor having a bound matching a bound of N; and returning to said step of finding an intersection N if at least X abstract sensors remain in said ordered list.

14. A multi-hop information forwarding method for a wireless network having a plurality of distributed nodes operable as data source nodes and forwarding nodes, said method comprising:

transmitting a first signal from a first data source node to neighboring nodes among said plurality of distributed nodes;

transmitting a reply signal from each neighboring node which receives said first signal from said first source node, said reply signal including a weighted sum of factors including an energy factor and a distance factor for the neighboring node, said energy factor being indicative of the neighboring node's energy level and said distance factor being indicative of its distance from said first source node;

selecting a forwarding node from among said neighboring nodes on the basis of said weighted sums;

transmitting a data packet from said first source node to said selected forwarding node; and receiving said data packet at said selected forwarding node and retransmitting it.

15. The method of claim 14, wherein said distance factor for each neighboring node includes the ratio of the distance between said first source node and the neighboring node to the distance between said first source node and a data sink node.

16. The method of claim 15, wherein said energy factor for each neighboring node includes the ratio of remaining energy to initial energy for the node.

17. The method of claim 16, wherein said neighboring nodes calculate said weighted sum in response to said first signal from said data source.

18. The method of claim 17, wherein said weighted sum for each neighboring node is a weighted sum of said energy and distance factors and a third factor indicative of the probability of failure of node communication.

19. The method of claim 18, further comprising a direction criterion for selection of a forwarding node.

* * * * *